United States Patent [19]

Laverty et al.

[11] 4,248,979

[45] Feb. 3, 1981

[54] INTERNALLY PLASTICIZED POLY(VINYL CHLORIDE) BLOCK COPOLYMERS

[75] Inventors: John J. Laverty, Sterling Heights; Zachariah G. Gardlund, Utica, both of Mich.

[73] Assignee: General Motors Corporation, Detroit, Mich.

[21] Appl. No.: 878,714

[22] Filed: Feb. 17, 1978

[51] Int. Cl.³ .............. C08F 8/30; C08L 75/06; C08L 75/08
[52] U.S. Cl. .................. 525/129; 525/104; 525/130; 525/911
[58] Field of Search .............. 260/859 R, 859 PV; 525/129

[56] References Cited

U.S. PATENT DOCUMENTS

| 3,257,476 | 6/1966 | Tobolsky | 260/859 R |
| 3,291,859 | 12/1966 | Tobolsky | 260/859 R |
| 3,364,157 | 1/1968 | Halek | 260/859 R |
| 3,865,898 | 2/1975 | Tobolsky | 260/859 R |
| 3,935,367 | 1/1976 | Merrill | 260/859 R |
| 4,018,966 | 4/1977 | Antlfinger | 260/859 R |
| 4,093,573 | 6/1978 | Ramlow | 260/859 PV |

Primary Examiner—Paul Lieberman
Attorney, Agent, or Firm—George A. Grove

[57] ABSTRACT

According to our invention, thermoplastic poly(vinyl chloride) block copolymer resins of the $(AB)_n$ type are formed which are flexible without the addition of an external plasticizer for poly(vinyl chloride). These novel block copolymer resins have average molecular weights ($\overline{M}n$) in the range of from about 15,000 to 60,000 and contain alternating rigid poly(vinyl chloride) segments and flexible linear aliphatic polyether or polyester segments, each having an average molecular weight in the range of from about 1,000 to 5,000. The resins of our invention have excellent physical properties which make them suitable substitutes for externally plasticized poly(vinyl chloride) homopolymers, particularly in automotive applications.

5 Claims, No Drawings

INTERNALLY PLASTICIZED POLY(VINYL CHLORIDE) BLOCK COPOLYMERS

BACKGROUND OF THE INVENTION

This invention relates to internally plasticized poly(vinyl chloride) block copolymers. More particularly, this invention relates to thermoplastic block copolymers of the $(AB)_n$ type containing alternating rigid poly(vinyl chloride) segments and flexible polyether or polyester segments. The copolymers are useful without the addition of any external plasticizer for applications where externally plasticized PVC has heretofore been used. This invention also relates to processes of forming these block copolymers wherein the rigid and flexible polymer segments are connected with urethane linkages.

Poly(vinyl chloride) (PVC) homopolymer is a rigid thermoplastic material. However, it can be made soft and rubbery by mixing together 30 or more parts of a suitable external plasticizer such as di-2-ethylhexyl phthalate (DOP) per hundred parts of resin. Externally plasticized PVC finds extensive use in automotive materials such as vinyl upholstery fabric and covers for molded instrument panel pads, but plasticizer migration is a problem. Plasticizers tend to evaporate from the PVC at elevated temperatures. Eventually externally plasticized vinyl may lose flexibility and crack due to plasticizer loss.

In our earlier work we discovered that macroazonitrile molecules containing flexible poly(ethylene oxide) segments connected by thermally unstable azo linkages could be heated in the presence of vinyl chloride to initiate addition polymerization of vinyl chloride onto the ends of poly(ethylene oxide) segments. Thus, a flexible segment was incorporated between two rigid PVC segments. A detailed description of the ABA type block copolymer is set out in U.S. Pat. No. 3,949,015. The presence of the flexible polyoxyethylene segment in the block copolymer reduced the need for an external plasticizer. Although this approach mitigated the plasticizer migration problem somewhat, it did not represent a total solution since external plasticizers were still required to form molding compounds with a desired degree of flexibility.

OBJECTS OF THE INVENTION

It is an object of this invention to provide internally plasticized block copolymer resins containing poly(vinyl chloride) segments. Such resins are flexible enough for automotive applications without the addition of any external plasticizer. It is a more specific object to provide flexible, thermoplastic block copolymer resins which are characterized by flexible polyester or polyether block segments alternating with poly(vinyl chloride) block segments. These block copolymers are of the $(AB)_n$ type constituting multiple A-block segments of rigid poly(vinyl chloride) and B-block segments of flexible polyethers or polyesters. Our novel block copolymers have the desirable properties of externally plasticized PVC with none of the plasticizer migration problems.

It is a further object of our invention to provide a method of preparing our novel internally plasticized PVC block copolymers. A preferred process entails reacting linear hydroxy terminated PVC segments of a suitable molecular weight with isocyanate terminated polyether or polyester segments also of a suitable molecular weight. Block copolymers of the $(AB)_n$ type are thereby formed wherein the A-block segments are rigid poly(vinyl chloride) and the B-block segments are flexible polyether or polyester, the segments being joined by urethane linkages. Physical properties of our $(AB)_n$ block copolymers such as flexibility, elongation and tensile strength can be adjusted over a wide range by selecting rigid PVC segments and flexible polyether or polyester segments of suitable molecular weights.

SUMMARY OF THE INVENTION

In accordance with a preferred embodiment of our invention, these and other objects are achieved by providing a flexible, moldable, thermoplastic, poly(vinly chloride) based resin requiring no external plasticizer. The resin is a block copolymer of the $(AB)_n$ type wherein the A-blocks are rigid poly(vinyl chloride) segments and the B-blocks are flexible linear aliphatic polyether or polyester polymers, the A and B-blocks being joined by urethane linkages.

The block copolymers are formed from hydroxy terminated A and B segments. Either the A or B segments are first reacted with twice the chemically equivalent amount of a suitable diisocyanate to form the corresponding isocyanate capped segments. These are then reacted with the remaining hydroxy terminated A or B segments to join the polymer segments in alternating A-B order. The urethane linkages are formed between the PVC and polyether or polyester segments by the reaction of the isocyanate groups with the terminal hydroxyl functionalities of the segments. The average molecular weight ($\overline{M}n$) of the block copolymers is preferably within the range of 15,000 to 60,000 and the individual A and B segments preferably have average molecular weights ($\overline{M}n$) in the range of from about 1,000 to 5,000. The diisocyanates used to link the segments have lower molecular weights in the range of about 300 or less. Block copolymers with varied desirable physical properties can be made by selecting hard and soft segments of suitable molecular weights. For example, soft, stretchy vinyl sheets can be made by including $\overline{M}n$ 3000 polycaprolactone flexible segments between rigid $\overline{M}n$ 3000 PVC segments. Rigid sheets can be made by including shorter $\overline{M}n$ 1000 polytetramethylene oxide flexible segments between longer $\overline{M}n$ 4000 PVC rigid segments.

The flexible polymer block segments may be linear polyether glycols such as polypropylene oxide glycol, polytetramethylene oxide glycol or polyethylene oxide glycol. Also useful are polyester glycols such as hydroxy terminated polytetamethylene adipate and polycaprolactone.

Rigid hydroxy terminated PVC segments, $\overline{M}n$ 1000 to 5000, may be made by known techniques of dehydrochlorination and ozonolysis of relatively high molecular weight PVC ($\overline{M}n > 40,000$). Ozonolysis produces PVC segments terminated with carboxyl groups which are reduced to terminal hydroxyl groups with suitable reducing agents.

Our novel $(AB)_n$ block copolymers are thermoplastic and may be milled, extruded, or otherwise processed by known molding methods. They have physical properties as good or better than PVC homopolymers flexibilized by external plasticizers. The subject block copolymers have no plasticizer migration problem. These and other objects and advantages of our invention will be more clearly understood in view of the following detailed description and specific examples.

DETAILED DESCRIPTION OF THE INVENTION

In accordance with our invention, internally plasticized thermoplastic poly(vinyl chloride) block copolymers are provided. The compositions have physical properties equivalent to or better than externally plasticized PVC with none of the problems brought about by plasticizer migration.

The relevant physical properties of various internally plasticized block copolymer compositions prepared in accordance with this invention were evaluated and compared with conventionally plasticized PVC. These properties include the tensile strength (ASTM D-638-71), modulus at 100% elongation (ASTM D-638-71), ultimate elongation, and hardness (ASTM D-2240-68). Table I lists the physical properties of Diamond Shamrock P-40 PVC homopolymer resin, average molecular weight about 45,000, with varying parts per hundred PVC resin of di-2-ethylhexyl phthalate (DOP) plasticizer. Shore "D" hardness was determined on thick (0.8 mm) cast films. All other measurements were made on films 0.08 mm thick made by doctor blading resin solutions on glass plates and evaporating the solvent. Films containing 100 phr DOP were too soft to be cut into test slabs.

TABLE I
FILM PROPERTIES OF PVC EXTERNALLY PLASTICIZED WITH DOP

| | DOP (phr) | | | | |
|---|---|---|---|---|---|
| | 0 | 20 | 40 | 60 | 80 |
| Tensile Strength (MPa) | 30.7 | 25.4 | 16.6 | 11.0 | 7.7 |
| 100% Modulus (MPa) | — | 21.4 | 11.6 | 6.1 | 3.8 |
| Elongation (%) | 58 | 190 | 255 | 285 | 360 |
| Shore "D" Hardness | 80 | 62 | 38 | 21 | 15 |

Plasticized PVC sheet material with Shore "D" values of 20–25 is suitable for upholstery fabric where material of Shore "D" 50 could be used to form covers for automotive instrument panel pads.

In the following examples we show how representative samples of our novel internally plasticized PVC $(AB)_n$ block copolymers can be made and illustrate the excellent physical properties which make them suitable substitutes for externally plasticized poly(vinyl chloride) homopolymers in automotive applications.

EXAMPLE I

Carboxyl group terminated PVC was prepared by ozonolysis of high molecular weight PVC in chlorinated solvents at elevated temperatures. 800 grams of powdered Monsanto Opalon ® PVC homopolymer resin, average molecular weight of 51,000 was mixed with 14 liters of dry 1,2-dichloroethane in a 22 liter capacity 3-neck flask. The flask was equipped with a high torque stirrer, thermometer, condenser, and fritted glass gas inlet tube. The suspension of PVC in the chlorinated solvent was heated to 70° C., promoting dehydrochlorination and double bond formation in the long chain PVC resin. Simultaneously, ozone, generated from a Welshbach Model T 408 Ozonator, was bubbled into the suspension at the rate of 65 milligrams per minute. The ozone reacted with the dehydrochlorinated PVC polymer at the points of unsaturation cleaving the polymer molecules at these locations and forming carboxyl groups at the ends of the cleaved segments. After three hours of ozonation, the suspension became very viscous as the carboxyl terminated cleaved PVC segments began to dissolve in the solvent. After 5 hours, the PVC was completely soluble in the solvent.

In order to terminate the ozonation reaction at a point where the cleaved segments were of a suitable average molecular weight, the reaction was followed by measuring the inherent viscosity of the carboxy terminated PVC at one hour intervals. The viscosity measurements were made on 0.5 gram samples of the reaction solution dissolved in 100 ml of dry tetrahydrofuran (THF). Inherent viscosities ranging above about 0.1 but less than about 0.25 corresponded generally to segments within the desired molecular weight range of about 1,000 to 5,000. The functionality, that is, the number of acid end groups per PVC segment, was determined by titrating samples with KOH. The functionalities were all close to two, indicating that the cleaved segments were linear with carboxyl groups at each end. Table II shows the functionalities, inherent viscosities, and corresponding average molecular weights (determined by vapor phase osmometry) of a number of samples made by the ozonization of Opalon ® resin.

TABLE II

| Inherent Viscosity | $\overline{M}_n$ | Functionality |
|---|---|---|
| 0.12 | 1585 | 1.98 |
| 0.16 | 2630 | 1.88 |
| 0.18 | 2740 | 1.86 |
| 0.23 | 3540 | 2.02 |

In the subject preparation, ozonization was halted after 28 hours when the inherent viscosity of the PVC in THF was 0.18. The solution was flushed with nitrogen to remove all traces of ozone. The solvent was removed in vacuo and the polymer precipitated into methanol. The product was washed in methanol, dried for 24 hours in a vacuum at 50° C. and weighed. 718 grams of product were formed, corresponding to about a 90% conversion of the Opalon ® resin to carboxyl terminated PVC segments. The average molecular weight $\overline{M}_n$ was determined to be about 2740 by vapor phase osmometry (VPO). An infrared spectrum of the sample showed a strong carbonyl maximum at 1730 centimeters$^{-1}$. The oxygen content of the polymer was determined to be about 2% with a Perkin-Elmer 240 Elemental Analyzer.

EXAMPLE II

The carboxyl end groups of the PVC segments formed as in Example I can readily be reduced to hydroxyl groups by well known reducing agents such as diborane, lithium aluminum hydride, sodium diethyldihydroaluminate or bis(2-methoxyethoxy) aluminum hydride.

In a typical procedure, 600 grams of acid group terminated PVC with a molecular weight of about 3,300 was mixed with 5000 ml of dry tetrahydrofuran in a 22 liter capacity 3-neck flask. The flask was equipped with a high torque stirrer, thermometer, addition funnel and nitrogen inlet tube. The solution was stirred under a nitrogen atmosphere at room temperature while 800 mls of one molar diborane in tetrahydrofuran was added. The solution of the reducing agent and the carboxyl terminated PVC was warmed at 40° C. and a heavy gel formed. Stirring was stopped and the solution was allowed to stand for five days at room temperature. At this time, an infrared spectrum of a sample taken from the reaction vessel showed a complete disappearance of the carbonyl maximum at 1730 cm$^{-1}$, indicating that all of the carboxyl end groups had been reduced. Water was carefully added to the solution to destroy any excess diborane and to dissolve the gel.

The tetrahydrofuran was removed in a vacuum, and the polymer was precipitated into acidified water and washed repeatedly with water and methanol. The resulting powder was dried for 24 hours in a vacuum at 50° C. 522 grams of product were obtained, corresponding to an 88% yield of hydroxy terminated PVC. The average molecular weight of the product was measured to be about 3250 by vapor phase osmometry (VPO). An infrared spectrum showed a broad hydroxyl maximum at 3400 cm$^{-1}$. The oxygen content of the polymer was about 1%.

Shorter reduction times of about one hour were sufficient when lithium aluminum hydride, sodium diethyldihydroaluminate and bis(2-methoxyethoxy) aluminum hydride was used as reducing agents.

EXAMPLE III

A poly(vinyl chloride)-polycaprolactone (AB)$_n$ block copolymer was prepared as follows. 30 grams (0.01) mole of molecular weight 3000 polycaprolactone glycol (hereafter referred to as PCL) was introduced into a dry, one liter Morton flask. The flask was equipped with a high speed stirrer, addition funnel, thermometer and nitrogen inlet tube. The glycol was heated to 60° C. under a nitrogen blanket and 0.021 mole (3.49 grams) of hexamethylene diisocyanate (HMDI) was added through the addition funnel. The mixture was stirred for two hours at 60° C. under nitrogen. The isocyanate capped polyol contained 2.21% NCO (theoretical 2.52% NCO) as determined by end group analysis.

With vigorous stirring a chemically equivalent amount of 4000 $\overline{M}n$ hydroxy terminated PVC (0.0075 mole), was added to the isocyanate terminated glycol at a rapid drop rate. The solution was stirred for two hours at 70° C. and became very viscous. An infrared spectrum of a sample of the liquid showed complete disappearance of the isocyanate maximum at 2260 cm$^{-1}$.

The reaction of the hexamethylene diisocyanate terminated polycaprolactone glycol and the hydroxy terminated PVC is believed to form a linear (AB)$_n$ block copolymer with alternating PVC and polyester segments as follows:

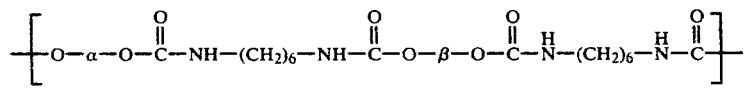

The rigid polymer A segments are comprised of repeating mer units of —CH$_2$—CHCl —of relatively high molecular weight ($\overline{M}n$ 4000) and the flexible B segments are comprised of repeating mer units

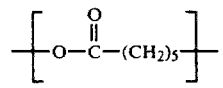

of relatively high molecular weight ($\overline{M}n$ 3000) with hydroxyl end groups, the A and B segments being joined by urethane

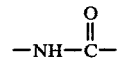

linkages formed with relatively low molecular weight (m.w. 168) hexamethylene diisocyanate.

The block copolymer reaction product was precipitated into water and washed repeatedly with hot water and then methanol. The sample was dried in the vacuum for 24 hours at 60° C. The yield was 55.2 grams corresponding to a 92% conversion of the reactants. The average molecular weight ($\overline{M}n$) of the copolymer was determined to be 19,300 by gel permeation chromatography (GPC).

Test films were prepared by dissolving 30 parts by weight (pbw) of the (AB)$_n$ block copolymer in 70 pbw THF. The solution was cast on a 10 cm by 15 cm glass plate with a doctoring blade. The THF was allowed to evaporate slowly in air and the plates were then heated in a vacuum oven for four hours at 65° C. to remove all traces of solvent. The film was transparent and had a uniform thickness of 0.08 mm. It was easily removed from the glass plate and test samples 0.6 cm by 6 cm were cut for determination of physical properties. Thick 0.8 mm films were cast in metal cups for determining Shore "D" Hardness.

The tensile strength, 100% modulus, ultimate elongation and Shore "D" hardness of the PVC-polycaprolactone block copolymer resin films were measured by the methods used to determine the properties of the externally plasticized PVC samples of Table I. Table III lists the results of tests. Table III also lists the film properties of P-40 resin externally plasticized with 60 phr DOP for purposes of comparison.

TABLE III

| | (PVC-PCL) Block Copolymers | |
|---|---|---|
| | PCL ($\overline{M}n$ 3000) PVC ($\overline{M}n$ 3000) Block Copolymer | PVC 60 phr DOP |
| Tensile Strength (MPa) | 22.8 | 11.0 |
| 100% Modulus (MPa) | 6.4 | 6.1 |
| Ultimate Elongation (%) | 617 | 285 |
| Shore "D" Hardness | 21 | 21 |

The hardness and modulus values of these externally and internally plasticized PVC homopolymers are comparable. However, our block copolymers are unexpectedly much stronger than externally plasticized films and can be stretched much farther without tearing.

EXAMPLE IV

A poly(vinyl chloride)-polytetramethylene adipate (AB)$_n$ block copolymer was formed by adding 5 grams (0.005 mole) of 1,000 molecular weight polytetramethylene adipate glycol to a flame dried 250 milliliter flask. The flask was equipped with a high speed stirrer, addition funnel, thermometer and nitrogen inlet tube. The glycol was heated at 60° C. and 2.5 grams (0.01 mole) of methylene-bis-(4-phenyl diisocyanate) (MDI) was added. The mixture was stirred for two hours at 60° C.

The isocyanate capped polyester glycol contained 5.1% NCO (theoretical 5.6%) as determined by standard end group analysis. To the product were added 50 ml of the solvent dimethylformamide and 5 drops of the urethane catalyst dibutyltin dilaurate. Then with vigorous stirring 16 grams (0.004 mole) of 4,000 molecular weight hydroxy terminated PVC dissolved in 100 milliliter of dimethylformamide were added to the isocyanate capped glycol at a rapid drop rate. The solution was stirred for four hours at 70° C. An infrared spectrum of the resulting product showed no isocyanate maximum at 2260 cm$^{-1}$. The solution was poured into water in a Waring blender to precipitate the $(AB)_n$ block copolymer. The product was washed with water and methanol and dried for 24 hours at 0.1 mm pressure at 60°. The yield was 20.9 grams corresponding to about an 89% conversion of the reactants. The inherent viscosity of the block copolymer determined as above was 0.68 and the molecular weight was determined to be 22,800 by GPC.

Films of the product were found and tested as in Example III. The results are listed in Table IV along with the film properties of 20 phr and 40 phr DOP plasticized P-40 resin for purposes of comparison.

TABLE IV

| | (PVC-PTMA) Block Copolymer | | |
|---|---|---|---|
| | PVC ($\overline{M}n$ 4000) PTMA ($\overline{M}n$ 1000) Block Copolymer | PVC 20 phr DOP | PVC 40 phr DOP |
| Tensile Strength (MPa) | 30.8 | 25.4 | 16.6 |
| 100% Modulus (MPa) | 27.3 | 21.4 | 11.6 |
| Ultimate Elongation (%) | 142 | 190 | 255 |
| Shore "D" Hardness | 47 | 62 | 38 |

Generally, PVC with about 20% external plasticizer is used in applications where a semi-rigid polymer is required. The block copolymer of this example would be equally suited for such applications. Our internally plasticized PVC was found to have higher tensile strength and modulus than the 20 phr externally plasticized PVC with slightly lower elongation and hardness.

EXAMPLE V

Two other PVC-polytetramethylene adipate glycol $(AB)_n$ block copolymers were prepared as in Example IV from $\overline{M}n$ 2000 adipate glycol segments and $\overline{M}n$ 3000 hydroxy terminated PVC segments. In one case the adipate glycol was capped with MDI and in the other methylene-bis-(4-cyclohexyl isocyanate) (MDCI).

Films were made and tested as in Example III. The results are shown in Table V.

TABLE V

| | (PVC-PTMA) Block Copolymer | |
|---|---|---|
| | PVC ($\overline{M}n$ 3000) PTMA ($Mn$ 2000) | |
| | MDI Capped | MDCI Capped |
| Tensile Strength (MPa) | 29.5 | 20.3 |
| 100% Modulus (MPa) | 14.3 | 12.5 |
| Ultimate Elongation (%) | 468 | 430 |
| Shore "D" Hardness | 20 | 25 |

It can be deduced from Table V that the measured physical properties of our $(AB)_n$ block copolymers depend to some extent on the diisocyanate chosen to form the urethane linkages between the segments. This may be due in part to a difference in the average molecular weight of the block copolymer resulting from the use of a particular diisocyanate.

We have used MDI, MDCI, HMDI and toluene diisocyanate (TDI) to form the urethane linkages in the subject $(AB)_n$ block copolymers. All have been found to be suitable coupling agents for the practice of our invention, and other diisocyanates could be employed with equal success by those skilled in the art. Generally, the diisocyanate has a relatively small molecular weight (300 or less) in comparison to the higher molecular weight block segments, m.w. about 1000 to 5000.

EXAMPLE VI

A poly(vinyl chloride)-polyethylene oxide $(AB)_n$ block copolymer was made by adding 3 grams (0.005 mole) of 600 molecular weight polyethylene oxide glycol into a dry Morton flask. The flask was equipped with a high speed stirrer, nitrogen inlet, thermometer, and addition funnel. The glycol was heated to 60° C. and 3 grams (0.011 mole) MDI was added. The mixture was stirred continuously for two hours at 60° C. with a nitrogen blanket and the isocyanate content was determined to be 6.85% (theoretical 7.64% NCO), 50 mls of the solvent tetramethylene sulfone and 50 mg of the urethane catalyst triethylene diamine were added to the isocyanate capped polyol. 15 grams (0.005 mole) of 3,000 molecular weight hydroxy terminated PVC dissolved in 100 ml of tetramethylene sulfone was added at a rapid drop rate with vigorous stirring. The solution was stirred for 8 hours at 70° C. and the reaction product was precipitated in methanol. The $(AB)_n$ block copolymer was dried for 24 hours under vacuum at 60° C. The yield was 17.4 grams corresponding to about an 83% conversion of the reactants. The inherent viscosity of the product in THF was determined to be 0.45 and the average molecular weight to be 17,300 by GPC.

Another polyvinyl chloride poly-ethyleneoxide $(AB)_n$ copolymer was prepared as above with a polyethyleneoxide glycol having an average molecular weight of about 6,000 and a hydroxy terminated poly(vinyl chloride) having an average molecular weight $\overline{M}n$ of about 4,000.

Films were made and tested as in Example III. The results are shown in Table VI.

TABLE VI

| | (PVC-PEO) Block Copolymers | |
|---|---|---|
| | PVC ($\overline{M}n$ 3000) PEO ($\overline{M}n$ 600) | PVC ($\overline{M}n$ 4000) PEO ($\overline{M}n$ 6000) |
| Tensile Strength (MPa) | 34.0 | 5.15 |
| 100% Modulus (MPa) | — | — |
| Ultimate Elongation (%) | 8 | 5 |
| Shore "D" Hardness | 70 | 20 |

Neither of the samples exhibited acceptable physical properties as a substitute for plasticized PVC sheet molding compound. It is believed that $\overline{M}n$ 600 polyethylene oxide segments are too short to form very flexible block copolymers according to our invention. Similarly, it is believed that $\overline{M}n$ 6000 polyether segments are too long to form block copolymers with good tensile strength.

EXAMPLE VII

A poly(vinly chloride)-polypropylene oxide block copolymer $(PVC-PPO)_n$ was made by adding 95 grams (0.048 mole) of 2,000 molecular weight polypropylene oxide glycol to a dry two-liter Morton flask equipped as in Example III. The glycol was heated to 60° C. and 24 grams (0.096 mole) of MDI was added over a period of two minutes with vigorous stirring. The mixture was stirred under nitrogen for four hours at 60° C. and the isocyanate content of the resulting capped glycol was experimentally determined to be 3.71% (theoretical 3.46% NCO) 100 mls of dry dimethylformamide, 10 drops dibutyltin dilaurate, and 100 mg trimethylene diamine were added to the isocyanate terminated polypropylene oxide. The solution was heated to 70° C. with vigorous stirring and 130 grams (0.052 mole) of $\overline{M}n$ 2,500 hydroxy terminated PVC, dissolved in 1000 mls of dry dimethylformamide, were added at a rapid drop rate with vigorous stirring. After six hours the solution was very viscous and infrared spectrum of a sample showed no isocyanate maximum. The polymer was precipitated into water and then washed repeatedly with hot water and methanol. The precipitate was dried for 24 hours under a vacuum at 60° C. The yield was 204 grams representing an 82% conversion of the reactants, and the average molecular weight of the product was about 30,000 as determined by GPC.

Another sample was prepared as above using an equivalent chemical amount of MDCI in place of the MDI.

Film properties of these block copolymers, determined as in Example III, are listed in Table VII. The physical properties of the P-40 resin with 40 phr DOP external plasticizer was included for reference.

TABLE VII

| | (PVC-PPO) Block Copolymers | | |
|---|---|---|---|
| | PVC ($\overline{M}n$ 2500) PPO (Mn 2000) | | PVC |
| | MDI | MDCI | 40 phr DOP |
| Tensile Strength (MPa) | 19.4 | 21.5 | 16.6 |
| 100% Modulus (MPa) | 16.7 | 17.3 | 11.6 |
| Ultimate Elongation (%) | 210 | 315 | 255 |
| Shore "D" Hardness | 48 | 42 | 38 |

EXAMPLE VIII

A poly(vinly chloride)-polytetramethylene oxide block copolymer (PVC-PTMO)$_n$ was prepared by adding 60 grams (0.03 mole) 2000 $\overline{M}n$ poly(tetramethylene oxide) glycol to a dry two liter Morton flask equipped as in Example III. The glycol was heated to 60° C. and 15.5 grams (0.06 mole) methylene-bis-(4-cyclohexyl isocyanate) (MDCI) was added at a rapid drop rate with vigorous stirring. The mixture was stirred for four hours at 60° C. under a nitrogen blanket.

The isocyanate content of the capped glycol was found to be 2.82% (theoretical 3.26% NCO). To this product, 100 ml dry dimethylformamide, 10 drops dibutyltin dilaurate, and 100 mg triethylenediamine were added. The solution was heated to 70° C. and 72 grams (0.024 mole) of 3,000 molecular weight hydroxy terminated PVC dissolved in 100 ml dimethylformamide was added at a rapid drop rate with vigorous stirring. After six hours, the solution became very viscous, and the infrared spectrum showed that the isocyanate maximum had completely disappeared. The polymer was precipitated into water, washed with water, then mathanol, and dried for 24 hours under vacuum at 60° C.

Other (PVC-PTMO)$_n$ block copolymers were formed as above from the following constituents: (a) polytetramethylene oxide glycol ($\overline{M}n$ 2,000), MDI, and hydroxy terminated PVC ($\overline{M}n$ 3,000); (b) polytetramethylene oxide glycol ($\overline{M}n$ 1,000), toluene diisocyanate (TDI), and hydroxy terminated PVC ($\overline{M}n$ 4,000); (c) polytetramethylene oxide glycol ($\overline{M}n$ 600), TDI, and hydroxy terminated PVC ($\overline{M}n$ 4,000).

Films were prepared from these (PVC-PTMO)$_n$ block copolymers and tested as in Example III. The results are listed in Table VIII.

TABLE VIII

| | (PVC-PTMO) Block Copolymers | | | |
|---|---|---|---|---|
| | ($\overline{M}n$) | | | |
| PVC | 3000 | 3000 | 4000 | 4000 |
| PTMO | 2000 | 2000 | 1000 | 600 |
| Diisocyanate | MDCI | MDI | TDI | TDI |
| Tensile Strength (MPa) | 25.1 | 29.2 | 30.4 | 34.1 |
| 100% Modulus (MPa) | 8.9 | 10.8 | 20.6 | — |
| Ultimate Elongation (%) | 475 | 480 | 125 | 70 |
| Shore "D" Hardness | 42 | 38 | 55 | 77 |

In the above examples, a polyether or polyester glycol was capped with a suitable diisocyanate and then reacted with hydroxy terminated PVC. However, our (AB)$_n$ block copolymers can also be made by reversing the reaction order, i.e., first capping a PVC glycol with a suitable diisocyanate and then adding a flexible glycol.

As shown in the examples, several different linear aliphatic polyether and polyester flexible segments were used to form our internally plasticized block copolymers. All such flexible linear polymer segments having average molecular weights in the range of from about 1000 to 5000 were found to be suitable. Therefore, we believe that other flexible polyether or polyester straight chain polymer segments in the subject weight range would be equally suited to the practice of our invention. Other coupling agents and flexible polymer segments such as butadiene, butadieneacrylonitrile, and siloxane glycols may also be used. Therefore out invention is not limited to only those flexible polymer segments and coupling agents set out in the examples.

While our invention has been disclosed in terms of certain specific embodiments, it will be appreciated that other forms could readily be adapted by one skilled in the art. Accordingly, the scope of our invention is to be considered limited only by the following claims.

The embodiments of the invention in which an exclusive property or privilege is claimed are defined as follows:

1. A method of making a thermoplastic block copolymer having alternating poly(vinyl chloride) segments and aliphatic polymer segments joined by urethane linkages comprising forming isocyanate terminated poly(vinyl chloride) by chemically combining hydroxy group terminated poly(vinyl chloride), having an average molecular weight ($\overline{M}n$) in the range of from about 1,000 to 5,000 with about twice the chemically equivalent amount of said hydroxy groups of a difunctional isocyanate having a molecular weight no greater than about 300, and then forming a said block copolymer by chemically combining said isocyanate terminated poly(vinly chloride) with about the chemically equivalent amount of one or more linear hydroxyl terminated aliphatic polymer constituents taken from the group consisting of polyethers and polyesters, said aliphatic polymer constituents having an average molecular weight ($\overline{Mn}$) in the range of from about 1,000 to 5,000, said block copolymer having an average molecular weight ($\overline{Mn}$) in the range of from about 15,000 to 60,000 and being flexible without the addition of external plasticizer.

2. A method of making a thermoplastic block copolymer of the (AB)$_n$ type particularly suitable for use in applications where externally plasticized poly(vinly chloride) may be used, but wherein said block copolymer is flexible without the addition of external plasticizer comprising forming an isocyanate terminated polymer by chemically combining one or more hydroxyl terminated linear polymer constituents taken from the group consisting of aliphatic polyethers and polyesters, having an average molecular weight ($\overline{Mn}$) in the range of from about 1,000 to 5,000, with about twice the chemically equivalents amount of said hydroxy groups of a difunctional isocyanate having a molecular weight no greater than about 300, and then forming a said block copolymer by chemically combining said isocyanate terminated polymer constituents with about the chemically equivalent amount of hydroxyl terminated poly(vinly chloride) having an average molecular weight ($\overline{Mn}$) in the range of from about 1,000 to 5,000, said block copolymer having an average molecular weight ($\overline{Mn}$) in the range of from about 15,000 to 60,000.

3. A method of making an internally plasticized poly(vinyl chloride)-containing block copolymer by incorporating flexible polymer segments in alternating sequence with rigid poly(vinyl chloride) segments in the block polymer chain comprising:

providing as a first block copolymer segment material one or more flexible, linear, hydroxy terminated polymer constituents taken from the group consisting of polyethers and polyesters, said polymer constituents being in the average molecular weight ($\overline{Mn}$) range of from about 1,000 to 5,000;

providing as a second block copolymer segment material a stoichiometric amount with respect to said flexible hydroxy terminated constituent of hydroxy terminated poly(vinly chloride) having an average molecular weight ($\overline{Mn}$) in the range of from about 1,000 to 5,000;

reacting either said first or second copolymer segment material with twice the stoichiometric amount of a difunctional isocyanate having a molecular weight of no greater than about 300 to form an isocyanate terminated copolymer segment material; and reacting said isocyanate terminated material with the other said copolymer segment material to form a moldable thermoplastic block copolymer with alternating said poly(vinyl chloride) and flexible polymer segments joined by urethane linkages, said block copolymer having an average molecular weight ($\overline{Mn}$) in the range of from about 15,000 to 60,000.

4. A method of internally plasticizing poly(vinyl chloride) resin by forming an (AB)$_n$-type block copolymer wherein the A-block segments are poly(vinyl chloride) and the B-block segments are flexible aliphatic polymers, the method comprising:

providing hydroxy terminated poly(vinyl chloride) and one or more flexible hydroxy terminated polymers taken from the group consisting of linear aliphatic polyethers or polyesters, said poly(vinyl chloride) and said flexible polymers having average molecular weights ($\overline{Mn}$) in the range of from about 1,000 to 5,000;

forming an isocyanate terminated prepolymer by reacting either said poly(vinyl chloride) or said flexible polymers with an amount of a difunctional isocyanate sufficient to consume all the hydroxy functions of the starting material, said isocyanate having a molecular weight less than about 300; and reacting said prepolymer with a stoichiometric amount of the remaining of either said hydroxy terminated poly(vinyl chloride) or said hydroxy terminated flexible polymers to form a block copolymer with strictly alternating poly(vinyl chloride) and flexible polymer segments having an average molecular weight ($\overline{Mn}$) in the range of from about 15,000 to 60,000, said segments being joined by urethane linkages, and said block copolymer being a flexible, moldable, thermoplastic material.

5. A method of making a thermoplastic, internally plasticized poly(vinyl chloride)-containing block copolymer having a Shore "D" hardness in the range of from about 20 to 70, its tensile strength, 100% modulus, and ultimate elongation being at least comparable to those of poly(vinyl chloride) homopolymer molecular weight ($\overline{Mn}$) about 45,000 externally plasticized with dioctyl phthalate and having like Shore "D" hardness, the method comprising:

providing hydroxy terminated poly(vinyl chloride) and one or more flexible hydroxy terminated polymers taken from the group consisting of poly(ethylene oxide), poly(propylene oxide), and poly(tetramethylene oxide), polycaprolactone, and poly(butyl adipate), said poly(vinyl chloride) and said flexible polymers having average molecular weights ($\overline{Mn}$) in the range of from about 1,000 to 5,000;

forming isocyanate terminated prepolymer by reacting either said hydroxy terminated poly(vinyl chloride) or said flexible polymers with twice the stoichiometric amount of a difunctional isocyanate taken from the group consisting of methylene diisocyanate, toluene diisocyanate, or methylene-bis-(4-cyclohexyl isocyanate); and reacting said prepolymer with a stoichiometric amount of the remaining of either said poly(vinyl chloride) or said flexible polymers to form a block copolymer with alternating rigid poly(vinyl chloride) and flexible polymer segments joined by urethane linkages, said block copolymer having an average molecular weight ($\overline{Mn}$) in the range of from about 15,000 to 60,000.

* * * * *